K. STAUB.
SLED.
APPLICATION FILED JAN. 22, 1913.
1,127,307.
Patented Feb. 2, 1915.
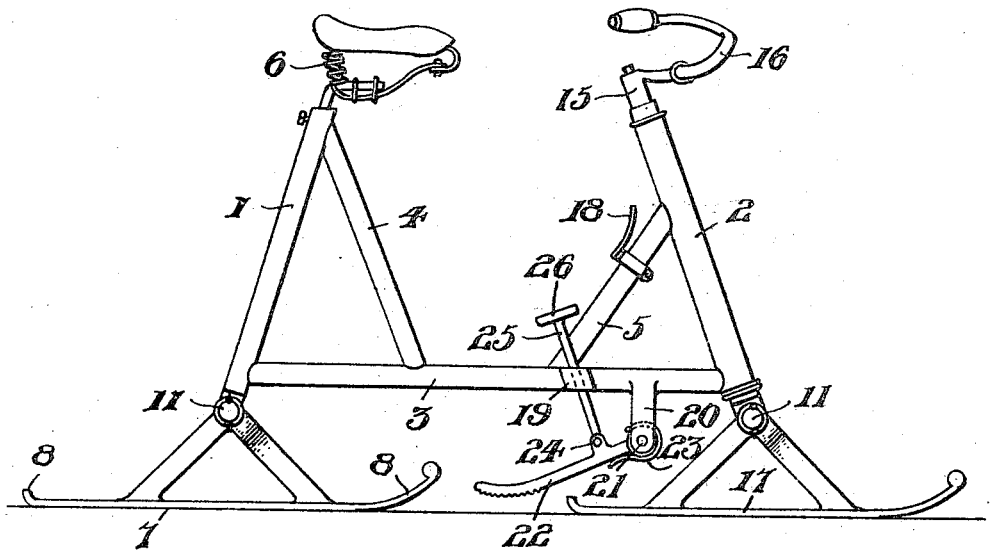
WITNESSES
INVENTOR
Karl Staub
By Henry C. Evert
ATTORNEY

UNITED STATES PATENT OFFICE.

KARL STAUB, OF TURTLE CREEK, PENNSYLVANIA.

SLED.

1,127,307.

Specification of Letters Patent.

Patented Feb. 2, 1915.

Application filed January 22, 1913. Serial No. 743,496.

*To all whom it may concern:*

Be it known that I, KARL STAUB, a citizen of the United States of America, residing at Turtle Creek, in the county of Allegheny and State of Pennsylvania, have invented certain new and useful Improvements in Sleds, of which the following is a specification, reference being had therein to the accompanying drawing.

This invention relates to sleds, and the primary object of my invention is to construct a sled upon the principle of a bicycle, that is, longitudinally alining runners instead of a set of parallel runners, and that has a novel brake whereby the sled can be safely used.

Reference will now be had to the drawing, wherein the figure illustrates a side elevation of the sled.

A sled in accordance with this invention comprises a tubular bicycle frame having a seat post 1, a steering post 2, a connecting bar 3 and angularly disposed braces 4 and 5. The steering post 2 supports a rotatable steering rod 15 having handle bars 16 at the upper end thereof and pivotally connected to the lower end of the rod 15, similar to the runner 7, is a forward runner 17. The angle brace 5 has a foot rest 18 and the longitudinal connecting bar 3 has a guide 19 and a hanger 20. Pivotally connected to the hanger 20 by a pin 21 is a brake shoe 22 that is supported normally elevated by a flat spring 23, carried by the hanger 20. The brake shoe 22 is pivotally connected, as at 24 to a rod 25 slidably mounted in the guide 19. The upper end of the rod 25 has a tread piece 26 in proximity to the foot rest 18, whereby the foot can be easily removed from said rest to shift the rod 25 and place the brake shoe 22 in use.

A greater degree of skill is required in using a bicycle sled than an ordinary sled, but as the bicycle sled can be more easily guided and controlled there is a degree of safety in using the same.

What I claim is:—

A bicycle sled comprising a frame having a longitudinally extending connecting bar formed with a guide adjacent its forward end, a hanger formed integral with and depending from said bar forwardly of the guide, a brake shoe pivotally connected at one end of said hanger, a spring secured to said hanger and adapted for engagement with said brake shoe and normally supporting said shoe in elevated position, and a rod extending through said guide and having its upper end provided with a tread being adapted for actuation to force the said brake shoe downwardly in engagement with the contact surface.

In testimony whereof I affix my signature in the presence of two witnesses.

KARL STAUB.

Witnesses:
MAX H. SROLOVITZ,
KATHERINE EVRETT.

Copies of this patent may be obtained for five cents each, by addressing the "Commissioner of Patents, Washington, D. C."